No. 853,100. PATENTED MAY 7, 1907.
C. LONG.
CATTLE GUARD.
APPLICATION FILED OCT. 24, 1906.
2 SHEETS—SHEET 1.
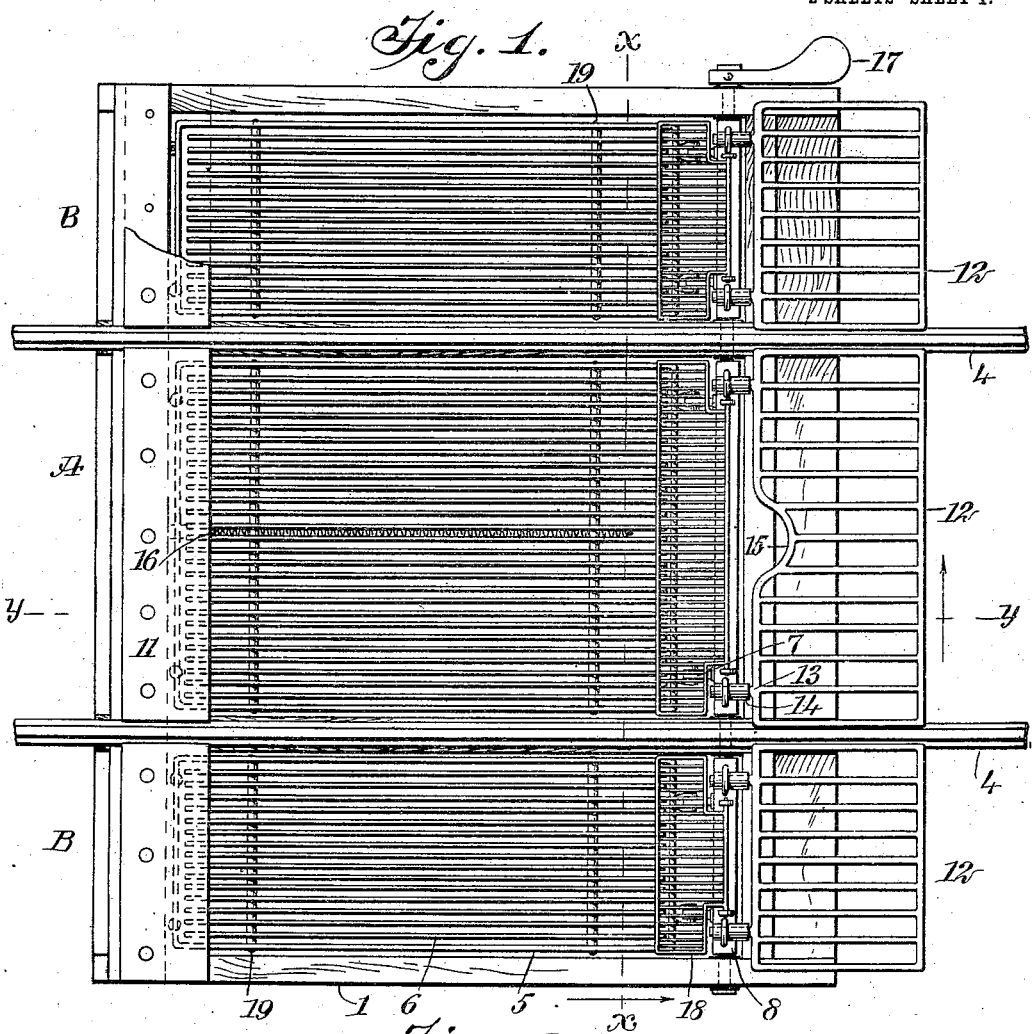
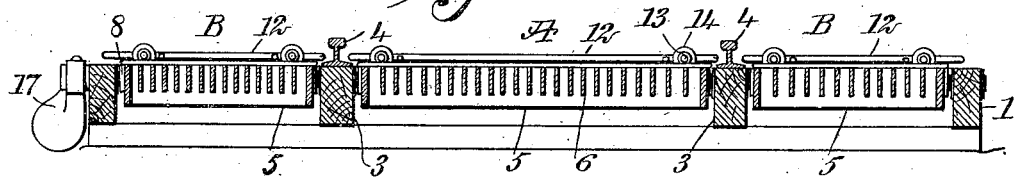
WITNESSES
INVENTOR
Clark Long
BY
ATTORNEYS

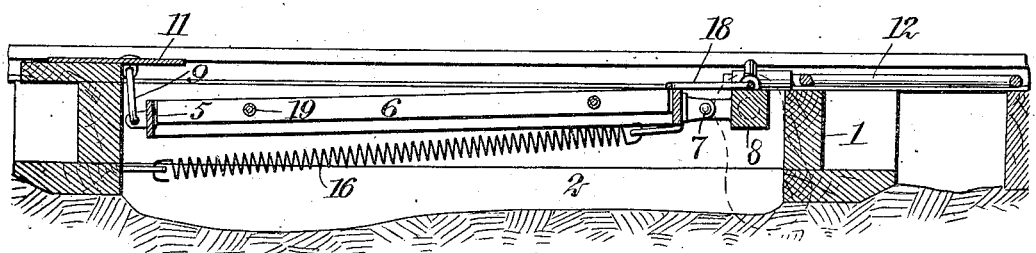
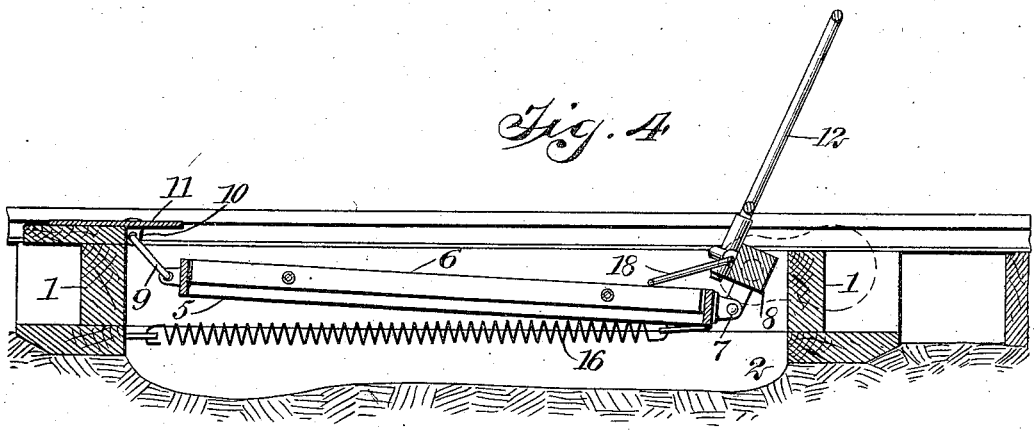
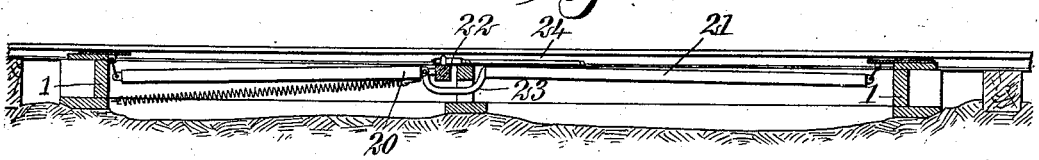

UNITED STATES PATENT OFFICE.

CLARK LONG, OF PAHA, WASHINGTON.

CATTLE-GUARD.

No. 853,100.                Specification of Letters Patent.           Patented May 7, 1907.

Application filed October 24, 1906. Serial No. 340,313.

*To all whom it may concern:*

Be it known that I, CLARK LONG, a citizen of the United States, and a resident of Paha, in the county of Adams and State of Washington, have invented a new and Improved Cattle-Guard, of which the following is a full, clear, and exact description.

This invention relates to improvements in cattle guards designed to be placed at railway crossings or at other points along a railway, an object being to provide a guard of simple construction, that will prevent the crossing of cattle and without danger of hurting the animals' feet.

Other objects of the invention will appear in the general description.

I will describe a cattle guard embodying my invention and then point out the novel features in the appended claims.

Reference is to be had to the accompanying drawings forming a part of this specification, in which similar characters of reference indicate corresponding parts in all the figures.

Figure 1 is a plan of a cattle guard embodying my invention; Fig. 2 is a section on the line x—x of Fig. 1; Fig. 3 is a section on the line y—y of Fig. 1; Fig. 4 is a section similar to Fig. 3 but showing the parts in different position; and Fig. 5 is a section showing a modification or double guard.

Referring to the drawings, 1 designates a frame of wood or other suitable material arranged around a trench 2 in the track-bed, and this frame comprises timbers 3 upon which the track-rails 4 are placed. The guard proper comprises a section A arranged between the track-rails, and sections B which are placed at the outer sides of the track-rails. These sections consist of frames 5 supporting slats 6 which extend longitudinally of the railway-track, and the several frames have at one end, for instance, at the end remote from the road-bed, pivotal connection 7 with a rock-shaft 8 mounted to swing in the frame 1. At the opposite ends, the said guard frames have link connections 9 with hangers 10 attached to the frame 1 or to metal plates 11 secured to the upper side of said frame and projecting over the space between the slat carrying frames and the main or fixed frame, thus preventing cattle or other animals from catching their feet into said space.

Removably connected to the rock shaft 8 at the inner ends of the several guards are gates 12 adapted to swing upward when the guard frames are forced downward by the weight of an animal. As here shown, the gates have projections 13 engaged loosely in sockets 14 secured to the rock shaft 8. It may be stated however, that the outer gates may be rigidly attached to the rock shaft, as the main object in making the center gate removable is that should it be blocked by a stone or other device and held in upright position the gate will be forced out of its socket by the cow-catcher of a locomotive engaging with the bottom portion thereof.

It will be noted in Fig. 1 that the bottom rail of the center gate is curved upward as indicated at 15, to receive the point of a cow-catcher. A spring 16 is attached at one end to the inner end of the center guard-frame and at the other end to the fixed frame 1 which will serve as a counter-balance, to move the guard frame to normal position upon being relieved of the weight of an animal, or such counter-balance may be formed by a weight 17 on the end of the rock-shaft; in fact, in some instances it may be necessary to employ both counter-balances. To prevent an animal's foot from passing into the space between the rock-shaft and the guard frames I employ skeleton-like aprons 18 which have swinging connection with the rock-shaft and bear at their free ends loosely upon the bars of the several guards. These bars of the guards it will be noted are mounted on rods 19 arranged in the guard frames, and by spacing the several bars as indicated, it is evident that snow or the like may readily pass between the bars into the pit 2.

In operation, should an animal attempt to cross the guard, the weight of the animal will depress the several guards, causing the gates to swing upward, thus presenting a barrier to prevent the crossing of the animal. Upon being relieved of the weight, the parts will be returned to normal position as before described.

In Fig. 5 I have shown the frames carrying the guard bars so arranged as to prevent the passing of an animal from either side, that is, there are two sets of guards indicated at 20 and 21. The frames carrying the bars 20 have link connection with the main frame as before described and also have swinging connection with a rock-bar 22 arranged practically at the center of the cattle guard, while the frames carrying the bars 21 also have link connection with the main frame 1 and the inner ends of these last-named frames have yoke connections 23 with the pivots connecting the frames of the bars 20 with the rock-shaft. Connected to the rock-shaft in the manner heretofore mentioned are gates 24, which of course are near the center of the cattle guard.

Having thus described my invention, I claim as new and desire to secure by Letters Patent:—

1. A cattle guard comprising a guard frame having bars, a main frame, link connections between the main frame and one end of the guard frame, a rock shaft mounted in the main frame, pivotal connection between said rock shaft and the opposite end of the guard frame, and a gate carried by the rock shaft.

2. A cattle guard comprising a main or fixed frame, a guard frame of skeleton form, link connections between one end of the guard frame and the main frame, a rock shaft mounted in the main frame, pivotal connections between the rock shaft and the guard frame, socket members on the rock shaft, and a gate having portions for engaging in said socket members.

3. A cattle guard comprising a main or fixed frame, a guard frame having bars spaced apart, link connections between the guard frame and the main frame, a rock shaft mounted in the main frame, pivotal connection between the guard frame and said rock shaft, a gate carried by the rock shaft, and an apron having swinging connection with the rock shaft and engaging loosely on the guard.

4. A cattle guard comprising a fixed frame, a guard frame having bars mounted to swing in said fixed frame between railway track rails, a rock-shaft with which said frame has pivotal connection, said rock-shaft being mounted in the fixed frame, socket members on said rock-shaft, a gate having portions for engaging in said socket members, and a bottom rail for said gate curved upward at its center.

In testimony whereof I have signed my name to this specification in the presence of two subscribing witnesses.

CLARK LONG.

Witnesses:
R. L. PARKER,
F. L. FROST.